United States Patent
Kishiyama

(10) Patent No.: US 10,524,252 B2
(45) Date of Patent: Dec. 31, 2019

(54) MOBILE TERMINAL APPARATUS, BASE STATION APPARATUS, AND RADIO COMMUNICATION METHOD FOR CELL DISCOVERY TIMING

(71) Applicant: NTT DOCOMO, INC., Tokyo (JP)

(72) Inventor: Yoshihisa Kishiyama, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 355 days.

(21) Appl. No.: 15/183,379

(22) Filed: Jun. 15, 2016

(65) Prior Publication Data

US 2016/0330734 A1 Nov. 10, 2016

Related U.S. Application Data

(63) Continuation of application No. 14/355,637, filed as application No. PCT/JP2012/079091 on Nov. 9, 2012, now abandoned.

(30) Foreign Application Priority Data

Nov. 11, 2011 (JP) .................................. 2011-247804

(51) Int. Cl.
*H04W 72/04* (2009.01)
*H04L 5/00* (2006.01)

(52) U.S. Cl.
CPC ....... *H04W 72/0426* (2013.01); *H04L 5/0007* (2013.01); *H04L 5/0051* (2013.01); *H04L 5/0091* (2013.01); *H04W 72/0413* (2013.01)

(58) Field of Classification Search
CPC . H04W 16/14; H04W 72/10; H04W 56/0085; H04W 64/00; H04W 74/04; H04W 8/245; H04W 72/042; H04W 84/045; H04W 28/26
See application file for complete search history.

(56) References Cited

U.S. PATENT DOCUMENTS

| | | | |
|---|---|---|---|
| 8,577,299 B2 | 11/2013 | Agrawal et al. | |
| 8,681,697 B2 | 3/2014 | Kwon et al. | |
| 2008/0080465 A1* | 4/2008 | Pajukoski | H04L 1/0016 370/342 |

(Continued)

FOREIGN PATENT DOCUMENTS

| | | | |
|---|---|---|---|
| CN | 1258150 A * | 6/2000 | ......... G06F 13/4282 |
| JP | 2010-118774 A | 5/2010 | |

(Continued)

OTHER PUBLICATIONS

First Notice of Office Action and Search Report dated Jan. 25, 2017, issued by the State Intellectual Property Office of The Peoples Republic of China in corresponding Chinese Patent Application No. CN-201280054617.0, with English translation (15 pages).

(Continued)

*Primary Examiner* — Sai Aung
(74) *Attorney, Agent, or Firm* — Osha Liang LLP

(57) ABSTRACT

A user equipment is disclosed including a first receiving section that receives control information in a first cell and a second receiving section that receives a detection signal in a second cell based on the control information. In the second cell, the control information is used to specify a radio resource to which the detection signal is allocated.

4 Claims, 11 Drawing Sheets

(56) References Cited

U.S. PATENT DOCUMENTS

| | | |
|---|---|---|
| 2010/0008317 A1 | 1/2010 | Bhattad et al. |
| 2010/0120438 A1 | 5/2010 | Kone et al. |
| 2010/0254338 A1 | 10/2010 | Tanaka |
| 2010/0322180 A1 | 12/2010 | Kim et al. |
| 2011/0058529 A1* | 3/2011 | Uemura ............ H04W 36/0077 370/331 |
| 2011/0170489 A1 | 7/2011 | Han et al. |
| 2011/0170496 A1 | 7/2011 | Fong et al. |
| 2011/0281590 A1 | 11/2011 | Frederiksen et al. |
| 2012/0182909 A1* | 7/2012 | Yamamoto .......... H04W 56/002 370/281 |
| 2013/0059625 A1 | 3/2013 | Clegg et al. |
| 2013/0090116 A1 | 4/2013 | Lim |
| 2013/0182583 A1 | 7/2013 | Siomina et al. |
| 2013/0182691 A1* | 7/2013 | Chmiel ............. H04W 56/0045 370/336 |
| 2013/0201930 A1 | 8/2013 | Okino et al. |
| 2014/0044108 A1* | 2/2014 | Earnshaw ............. G01S 5/0063 370/336 |
| 2016/0128095 A1* | 5/2016 | Damnjanovic ....... H04L 1/1812 370/336 |

FOREIGN PATENT DOCUMENTS

| | | |
|---|---|---|
| JP | 2011-091748 A | 5/2011 |
| WO | 2011/052774 A1 | 5/2011 |

OTHER PUBLICATIONS

Extended Search Report issued in corresponding European Application No. 12847187.7, dated Nov. 25, 2015 (7 pages).

Ericsson et al.; "Aspects on Distributed RRUs with Shared Cell-ID for Heterogeneous Deployments"; 3GPP TSG-RAN WG1 #64, R1-110649; Taipei, Taiwan; Feb. 21-25, 2011 (11 pages).

International Search Report for corresponding International Application No. PCT/JP2012/079091, dated Feb. 5, 2013 (4 pages).

3GPP TR 25.913 V8.0.0; "3rd Generation Partnership Project; Technical Specification Group Radio Acess Network; Requirements for Evolved UTRA (E-UTRA) and Evolved UTRAN (E-UTRAN) (Relese 8);" Dec. 2008 (18 pages).

Office Action issed in corresponding Japanese Application No. 2011-247804, dated Sep. 1, 2015 (6 pages).

Office Action issued in counterpart European Application No. 12847187.7, dated Jun. 24, 2019 (6 pages).

* cited by examiner

RADIO COMMUNICATION SCHEME FOR WIDE AREA

RADIO COMMUNICATION SCHEME FOR LOCAL AREA

RADIO COMMUNICATION SCHEME FOR WIDE AREA

RADIO COMMUNICATION SCHEME FOR LOCAL AREA

MOBILE TERMINAL APPARATUS, BASE STATION APPARATUS, AND RADIO COMMUNICATION METHOD FOR CELL DISCOVERY TIMING

TECHNICAL FIELD

The present invention relates to a radio communication system, a mobile terminal apparatus, a wide area base station apparatus, a local area base station apparatus and a radio communication method in a next-generation mobile communication system.

BACKGROUND ART

In a UMTS (Universal Mobile Telecommunications System) network, attempts are made to optimize features of the system, which are based on W-CDMA (Wideband Code Division Multiple Access), by adopting HSDPA (High Speed Downlink Packet Access) and HSUPA (High Speed Uplink Packet Access), for the purposes of improving spectral efficiency and improving the data rates. With this UMTS network, long-term evolution (LTE) is under study for the purposes of further increasing high-speed data rates, providing low delay, and so on (non-patent literature 1).

In LTE, as multiple access schemes, a scheme that is based on OFDMA (Orthogonal Frequency Division Multiple Access) is used on the downlink, and a scheme that is based on SC-FDMA (Single Carrier Frequency Division Multiple Access) is used on the uplink. Also, successor systems of LTE (referred to as, for example, "LTE-Advanced" or "LTE enhancement" (hereinafter referred to as "LTE-A")) are under study for the purposes of further broadbandization and increased speed beyond LTE.

CITATION LIST

Non-Patent Literature

Non-Patent Literature 1: 3GPP TR 25.913 "Requirements for Evolved UTRA and Evolved UTRAN"

SUMMARY OF THE INVENTION

Technical Problem

Now, in cellular systems such as W-CDMA, LTE (Rel. 8), and successor systems of LTE (for example, Rel. 9 and Rel. 10), radio communication schemes (radio interfaces) are designed to support wide coverage. In the future, it is expected to provide high-speed wireless services by near-field communication in local areas such as indoors, shopping malls and so on, in addition to the cellular environment such as above. Consequently, there is a demand to design radio communication schemes that are specialized a for high-speed wireless services in local areas.

The present invention has been made in view of the above, and it is therefore an object of the present invention to provide a radio communication system, a mobile terminal apparatus, a wide area base station apparatus, a local area base station apparatus and a radio communication method that can provide highly efficient local area radio access.

Solution to Problem

A radio communication system according to the present invention includes a wide area base station apparatus that covers a wide area, a local area base station apparatus that covers a local area arranged in the wide area, and a mobile terminal apparatus that communicates with the wide area base station apparatus by a radio communication scheme for the wide area and that communicates with the local area base station apparatus by a radio communication scheme for the local area, and, in this radio communication system, in the radio communication scheme for the local area, wide area control information that is used in the radio communication scheme for the wide area is used.

Technical Advantage of the Invention

According to the present invention, it is possible to easily assimilate a local area into a wide area having different requirements, by utilizing wide area control information that is used in the radio communication scheme for the wide area in the radio communication scheme for the local area. Consequently, it is possible to provide highly efficient local area radio access that is specialized for local areas, in a local area arranged in a wide area.

DESCRIPTION OF EMBODIMENTS

Figure 1A:
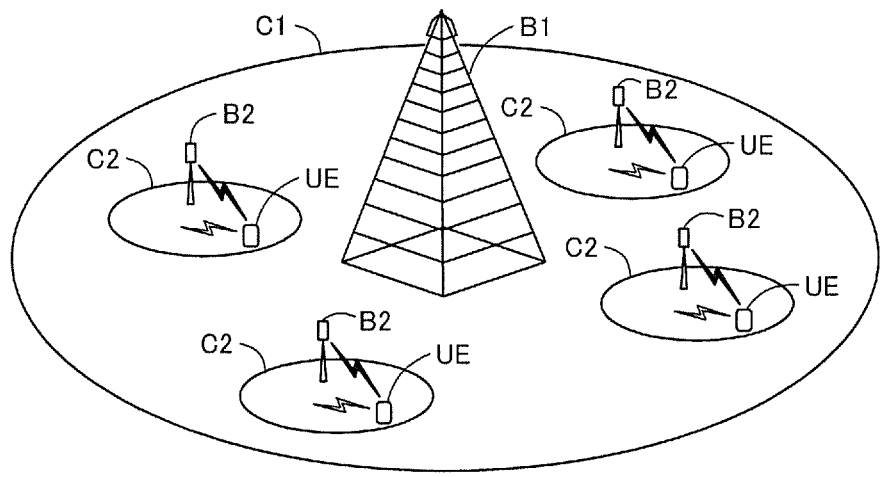
FIGS. 1A and 1B provide diagrams to explain a layered network.
Figure 1B:
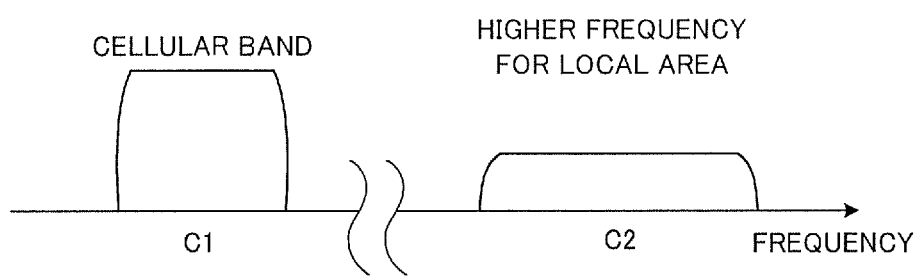

FIGS. 1A and 1B provide diagrams to explain a layered network. For example, in successor systems of LTE, a layered network such as a Heterogeneous network, in which large-sized cells and small-sized cells are overlaid, is under study. As shown in FIG. 1A, a layered network is formed by arranging a plurality of point-specific local areas (small-sized cells) C2, which are covered by local area base station apparatuses B2, in a wide area (large-sized cell) C1 covered by a wide area base station apparatus B1.

In this layered network, each local area C2 is independent, and a handover is executed between local areas C2 as well. In this case, measurements for handover are executed frequently, and there is therefore a problem that, not only the battery of mobile terminal apparatuses UE, but also the power consumption of the network device of base station apparatus B2 increases. Furthermore, since area-specific identification information such as cell IDs vary per local area C2, the cell planning and maintenance support upon assimilating local areas C2 into wide area C1 become complex.

Consequently, there is a demand for a communication system design that allows differences between cells to pass unrecognized, by integrating a plurality of local areas C2 in wide area C1. Also, in the communication system shown in FIG. 1A, the same frequency band is allocated between wide area C1 and local areas C2. Consequently, interference between the cells is prevented by CoMP (Coordinated Multiple Point) transmission, interference coordination technology (eICIC: enhanced Inter-Cell Interference Coordination), and so on.

To begin with, wide area C1 and local areas C2 all have different optimal frequency bands. That is, in wide area C1, since it is necessary to secure wide coverage, it is then necessary to support high transmission power density in a low frequency band. On the other hand, in local areas C2, since high-speed wireless services through near-field communication are demanded, it is then necessary to support high data rates in a high frequency band, in order to make possible such high-speed wireless services. Consequently, as shown in FIG. 1B, it is preferable to allocate a low frequency band to wide area C1 and allocate a high frequency band to local areas C2.

Therefore, the present inventors have arrived at the present invention in order to provide a communication system design which meets each cell's optimal requirements and which allows differences between cells to pass unrecognized. That is, a gist of the present invention is to assimilate local areas C2 into wide area C1 such that a mobile terminal apparatus does not recognize the differences between the cells, by utilizing wide area control information used in a radio communication scheme that is optimal for wide area C1, in a radio communication scheme that is optimal for local areas C2.

Hereinafter, the wide area radio communication scheme and the local area radio communication scheme, used in wide area C1 and local areas C2, respectively, will be described. Note that the radio communication system according to the present embodiment may support successors of LTE-A (Rel. 11 and later versions) or support FRA (Future Radio Access). Also, a radio communication scheme may be referred to as a "radio interface" or may be referred to as a "radio interface scheme." Wide area C1 may be a macro cell, a sector and/or the like. A local area C2 may be a pico cell, a nano cell, a femto cell, a micro cell and/or the like, and may be provided outdoors as well as indoors.

As noted above, in wide area C1, the priority is on securing wide coverage, and, in local area C2, the priority is on high data rates. In this way, the requirements of radio parameters are different between the radio communication scheme for the wide area and the radio communication scheme for the local area. Now, an example of radio parameters for the wide area and the local area will be described with reference to FIG. 2. Note that the radio communication schemes for the wide area and the local area will be described on the assumption that they support a radio resource configuration of an OFDM scheme.

Figure 2:
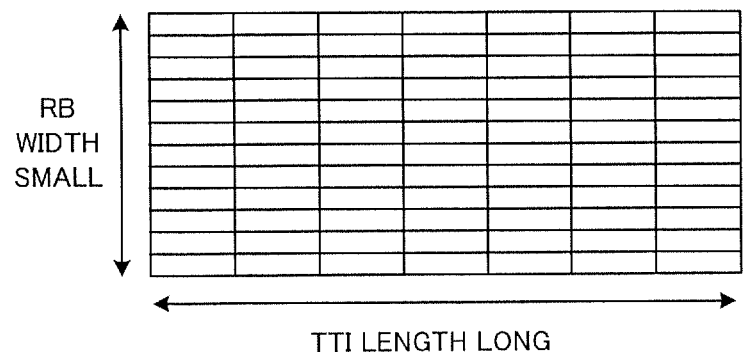
FIG. 2 is a diagram to explain radio parameters for a wide area and a local area.
Figure 2:
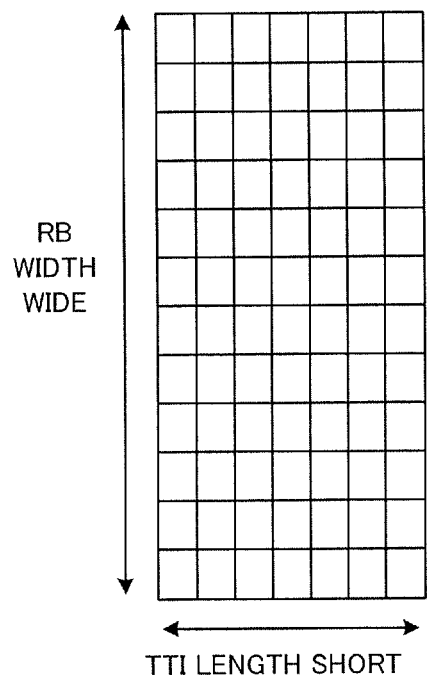

As shown in FIG. 2, in the radio communication scheme for the wide area, radio resources are allocated in one-resource-block units. One resource block is formed with twelve subcarriers (narrow band signals) that are consecutive in the frequency direction and fourteen symbols that are consecutive in the time axis direction. Also, in the radio communication scheme for the local area, similar to the radio communication scheme for the wide area, radio resources are allocated in one-resource-block units. The size of this resource block is determined by radio parameters.

Here, as radio parameters, the transmission time interval (TTI) length, the round trip delay (RTD), the cyclic prefix (CP) length, the subcarrier interval, and the resource block width will be described. Note that the radio parameters are by no means limited to these. Also, note that the transmission time interval represents the time duration of the allocation unit of transmission data, and the resource block width represents the bandwidth of the allocation unit of transmission data.

In wide area C1, the priority is on securing coverage, so that the TTI length and the RTD are set rather long. By contrast with this, in local area C2, achieving lower delay is prioritized over coverage, in order to secure high data rates, so that the TTI length and the RTD are set shorter than in wide area C1. Also, since wide area C1 has a large cell radius, the CP length is set rather long, taking into account comparatively large delayed waves. By contrast with this, since local area C2 has a small cell radius, it is not necessary to take into account comparatively large delayed waves, and therefore the CP length is set shorter than in wide area C1.

Also, since a low frequency band, in which the influence of the Doppler shift is insignificant, is allocated to wide area C1, the subcarrier interval is set small. By contrast with this, a high frequency band, in which the influence of the Doppler shift is significant, is allocated to local area C2, so that the subcarrier interval is set larger than in wide area C1. Also, since, in wide area C1, the environment varies significantly and the frequency selectivity also changes, the resource block width is set small. By contrast with this, in local area C2, the environment does not vary much and also the frequency selectivity is flat, so that the resource block width is set large.

In this way, in the radio communication scheme for the wide area and the radio communication scheme for the local area, separate adequate radio parameters are set. Consequently, resource blocks for wide area C1, where the priority is on coverage, are set to be short in the frequency direction and long in the time axis direction. Resource blocks for local area C2, where the priority is on lower delay, are set to be long in the frequency direction and short in the time axis direction.

Note that the present invention is by no means limited to configurations to fulfill all of the above-described radio parameter requirements. That is, it suffices to satisfy the requirement of at least one of the TTI length, the RTD, the CP length, the subcarrier interval, and the resource block width. For example, when the resource block width for local area C2 is greater than that of wide area C1, the TTI length for local area C2 may be set longer than the TTI length for wide area C1.

Next, a wide area synchronization signal and a local area synchronization signal will be described with reference to FIG. 3. Note that the name "synchronization signal" is used to refer to a signal that is used for a cell search to detect surrounding base stations with which a mobile terminal apparatus can connect, and signals of different names may be defined between a wide area and a local area (for example, detection signal (discovery signal), identification signal (beacon signal), etc.). In the radio communication system according to the present embodiment, after a mobile terminal apparatus establishes communication in a wide area, the mobile terminal apparatus is able to communicate in a local area.

Figure 3:
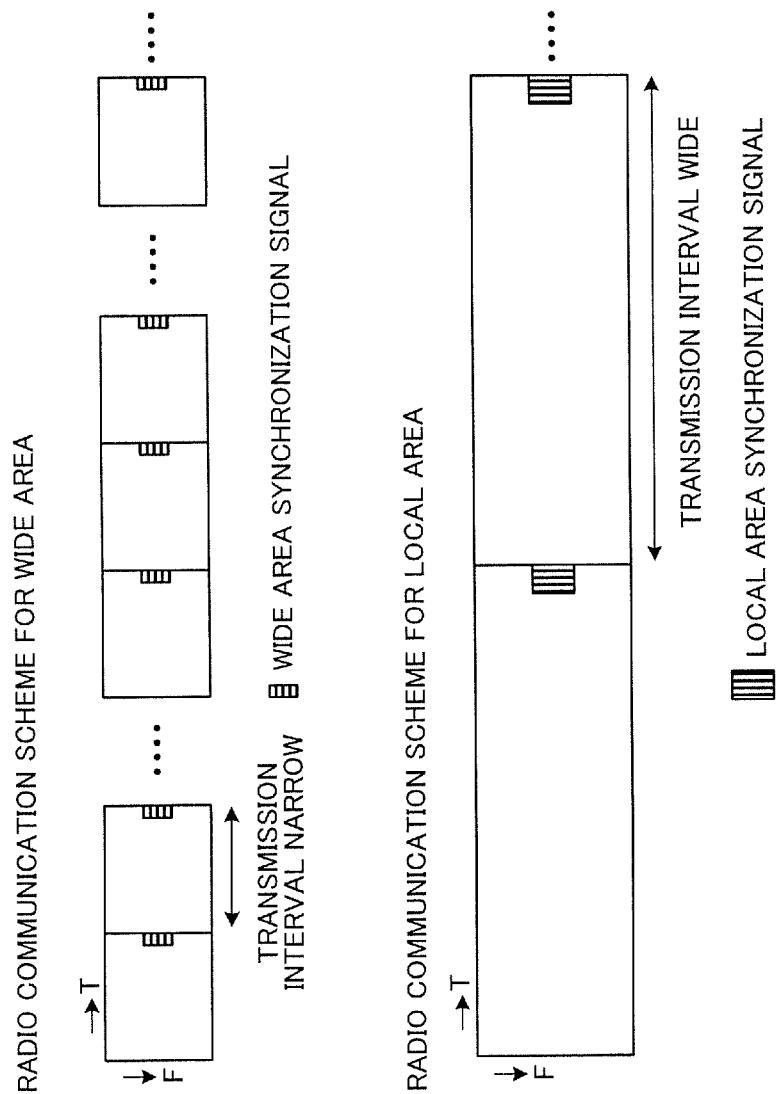
FIG. 3 is a diagram to explain synchronization signals for a wide area and a local area.

As shown in FIG. 3, in order to allow a mobile terminal apparatus to establish communication with the wide area base station apparatus first, the cell search time is set short in the radio communication scheme for the wide area. Then, the transmission interval of the wide area synchronization signal is set short. In this way, in wide area C1, by using a wide area synchronization signal to be transmitted with high frequency, the cell search time is made short and a high-speed cell search is made possible.

By contrast with this, in local area C2, a cell search is executed while communication is established between a mobile terminal apparatus and the wide area base station apparatus. Consequently, with the radio communication scheme for the local area, it is not necessary to perform a high-speed cell search. So, the transmission interval of the local area synchronization signal is set longer than that of the wide area synchronization signal. By this means, the network device on the local area base station side is able to stop the amplifier between these transmission intervals and save power consumption. Also, the mobile terminal apparatus is able to lower the number of times to perform a cell search and save the power consumption of the battery.

Also, since the frequency of transmitting the wide area synchronization signal is set high, it is not necessary to achieve synchronization reliably in one try. Consequently, with the wide area synchronization signal, the amount of radio resources is set minimal for reduced overhead. Meanwhile, the frequency of transmitting the local area synchronization signal is set low, so that it is necessary to achieve synchronization reliably, in one try. Consequently, the local area synchronization signal is allocated to radio resources over a large range in the time and/or frequency domain compared to the wide area synchronization signal.

Also, the transmission interval of the local area synchronization signal is set in accordance with wide area control information from the wide area base station apparatus. For example, as wide area control information, radio resource information of the local area synchronization signal is reported form the wide area base station apparatus. The local area base station apparatus changes the transmission interval of the local area synchronization signal based on the transmission interval included in this radio resource information and the synchronization timing of the wide area base station apparatus.

By this means, it is possible to limit the cell search time of local area C2 based on the radio resource information of the local area synchronization signal from the wide area base station apparatus. Note that the radio resource information of the local area synchronization signal may be, for example, the frequency position and the code of the local area synchronization signal, and may be configured to save power consumption by reporting the frequency position, the code and so on.

Next, reference signals and scrambling codes for a wide area and a local area will be described with reference to FIG. 4.

Figure 4:
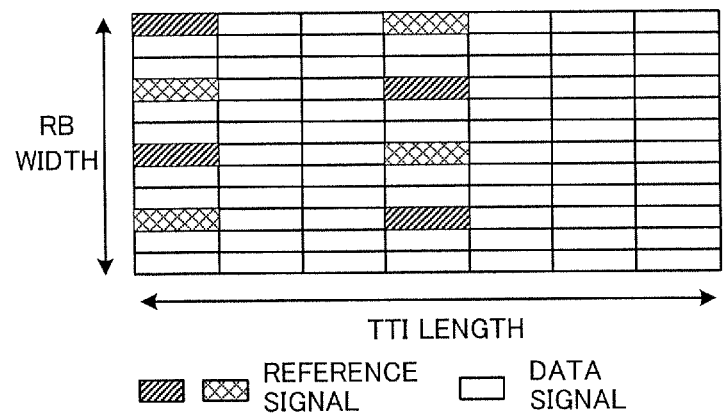
FIG. 4 is a diagram to explain reference signals and scrambling codes for a wide area and a local area.
Figure 4:
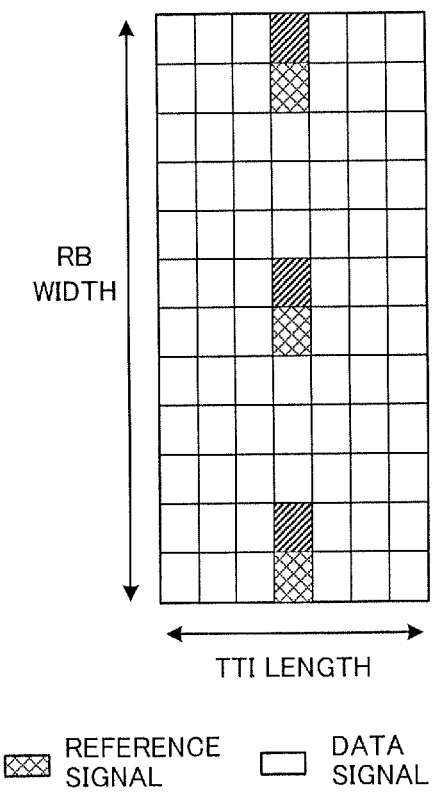

As shown in FIG. 4, a reference signal for the wide area is generated based on a cell ID, which is wide area-specific identification information. A scrambling code for the wide area is generated based on a user ID, which is user-specific identification information, in addition to the cell ID of wide area C1. A data signal for the wide area is scrambled by the cell ID of wide area C1 and a user ID. In this way, in wide area C1, the method of randomization differs between a reference signal and a data signal. Also, since, in wide area C1, randomization is carried out using the cell ID, such cell planning is required that the cell ID varies between neighboring areas.

By contrast with this, a reference signal and a scrambling code for a local area are generated based on a user ID that is reported as wide area control information. A data signal for the local area is scrambled by a user ID of a local area C2. In this way, in local area C2, the method of randomization matches between a reference signal and a data signal. Also, in local area C2, since randomization is carried out using a user ID that is reported from wide area C1, cell planning to apply different cell IDs between neighboring areas is not necessary.

In this way, it is not necessary to allocate an area-specific cell ID to local area C2, and therefore it becomes possible to easily assimilate local area C2 in wide area C1, such that the differences between the cells pass unrecognized. Note that the reference signal and data signal for the local area may be randomized using both a user ID and the cell ID of wide area C1. The cell ID of wide area C1 is included in the wide area synchronization signal. Also, the local area base station apparatuses may receive wide area control information directly from the wide area base station apparatus, or may receive wide area control information via a mobile terminal apparatus.

Next, uplink feedback control signals for a wide area and a local area will be described with reference to FIGS. 5A-5D. Note that, although the PUCCH (Physical Uplink Control Channel) signal defined in LTE will be described as an example of an uplink feedback control signal for the wide area, this is by no means limiting.

Figure 5A:
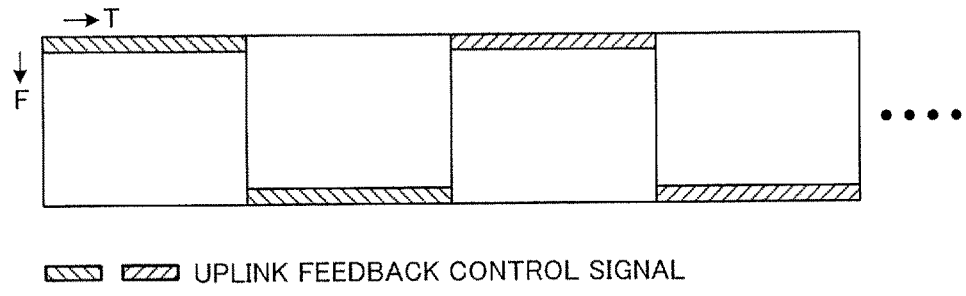
FIGS. 5A-5D provide diagrams to explain uplink feedback control signals for a wide area and a local area.

As shown in FIG. 5A, an uplink feedback control signal for the wide area is transmitted in single-carrier transmission of low PAPR (Peak-Average Power Ratio), in order to prioritize securing coverage. Also, the uplink feedback control signal for the wide area is designed as a narrow-band signal, in which the overhead per user is reduced so as to allow many users to be multiplexed. This narrow-band signal is allocated to radio resources at both ends of the system band, and is frequency-hopped between consecutive time slots, so that frequency diversity is achieved. In this way, the signal sequence length of the uplink feedback control signal for the wide area is short, so that it is necessary to increase randomization by cell planning.

By contrast with this, the coverage is narrow and the number of users to be multiplexed is low with an uplink feedback control signal for the local area, and therefore, by increasing overhead greater than the uplink feedback control signal for the wide area, the uplink feedback control signal for the local area is designed to be a wideband signal or have a short transmission time duration. In this way, since the signal sequence length of the uplink feedback control signal for the local area is long, sufficient randomization can be achieved between neighboring cells without cell planning.

Figure 5B:
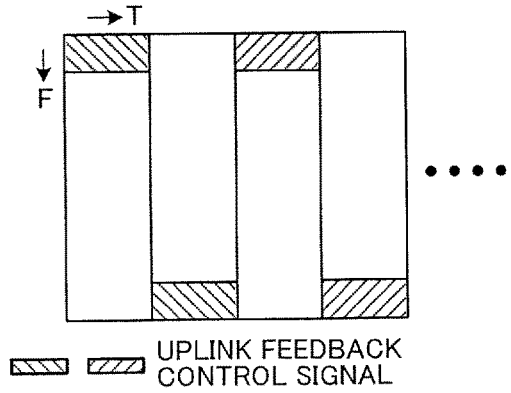
Figure 5C:
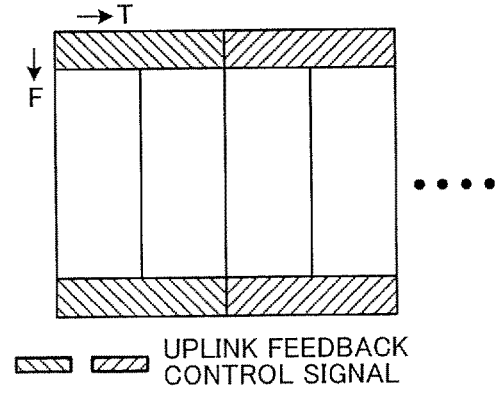
Figure 5D:
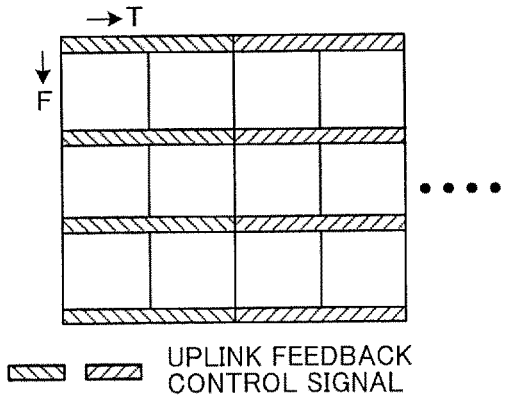

In this case, as shown in FIG. 5B, it may also be possible to allocate the wide-band local area feedback control signal at both ends of the system band and frequency-hop this signal between consecutive time slots. By this means, it is possible to achieve sufficient frequency diversity gain with single-carrier transmission. Also, as shown in FIG. 5C, it may be possible to allocate the wide-band local area feedback control signal at both ends of the system band and carry out multi-carrier transmission. By this means, it is possible to allocate an uplink feedback control signal over a wider band. Furthermore, as shown in FIG. 5D, it is also possible to divide the wide-band local area feedback control signal into a large number of narrow-band signals and carry out multi-carrier transmission. By this means, even more sufficient frequency diversity gain can be achieved.

Figure 6:
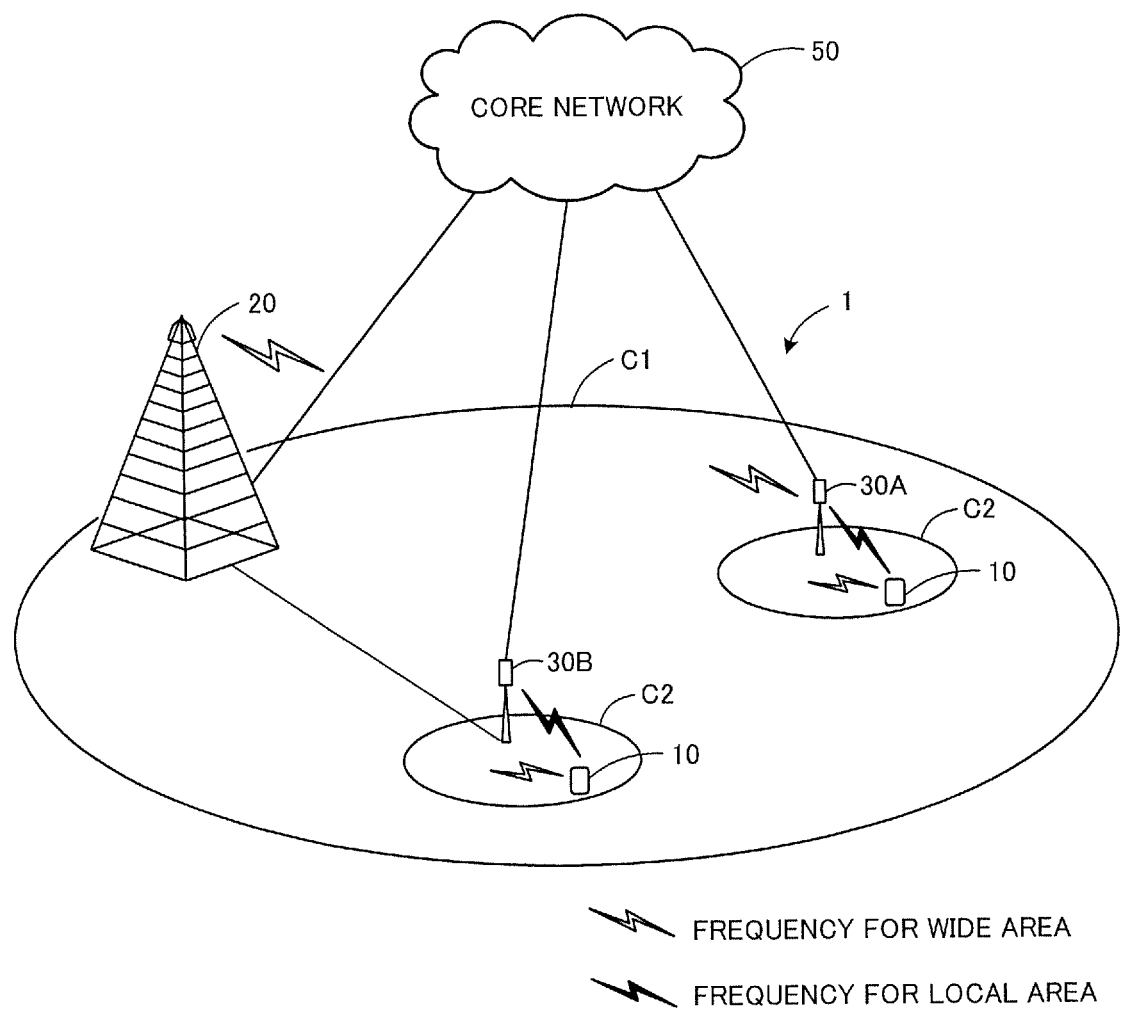
FIG. 6 is a diagram to explain a system configuration of a radio communication system.

Now, a radio communication system according to the present embodiment will be described below in detail. FIG. 6 is a diagram to explain a system configuration of a radio communication system according to the present embodiment. Note that the radio communication system shown in FIG. 6 is a system to accommodate, for example, the LTE system or its successor system. Also, this radio communication system may be referred to as "IMT-Advanced," "4G," or "FRA."

As shown in FIG. 6, a radio communication system 1 includes a wide area base station apparatus 20 that covers wide area C1, and local area base station apparatuses 30A and 30B that cover a plurality of local areas C2 provided in wide area C1. Also, in wide area C1 and in a plurality of local areas C2, many mobile terminal apparatuses 10 are arranged. The mobile terminal apparatuses 10 support the radio communication schemes S for the wide area and the local areas, and are designed to be able to communicate with the wide area base station apparatus 20 and the local area base station apparatuses 30A and 30B.

Communication between the mobile terminal apparatuses 10 and the wide area base station apparatus 20 is carried out using a frequency for the wide area (low frequency band). Communication between the mobile terminal apparatuses 10 and the local area base station apparatuses 30A and 30B is carried out using a frequency for the local areas (high frequency band). Communication between the wide area base station apparatus 20 and the local area base station apparatus 30A is carried out using the frequency for the wide area. Communication between the wide area base station apparatus 20 and the local area base station apparatus 30B is carried out via a wire transmission path.

Also, the wide area base station apparatus 20 and the local area base station apparatus 30A and 30B each are connected with a higher station apparatus, which is not illustrated, and are connected to a core network 50 via this higher station apparatus. Note that the mobile terminal apparatuses 10 may be either LTE terminals or LTE-A terminals, but will be described simply as "mobile terminal apparatus" in the following description, unless specified otherwise. Also, although the following description will assume, for case of explanation, that mobile terminal apparatuses perform radio communication with the wide area base station apparatus 20 and the local area base station apparatuses 30A and 30B, more generally, user equipment (UE) to include both mobile terminal apparatuses and fixed terminal apparatuses may be used as well.

Figure 7:
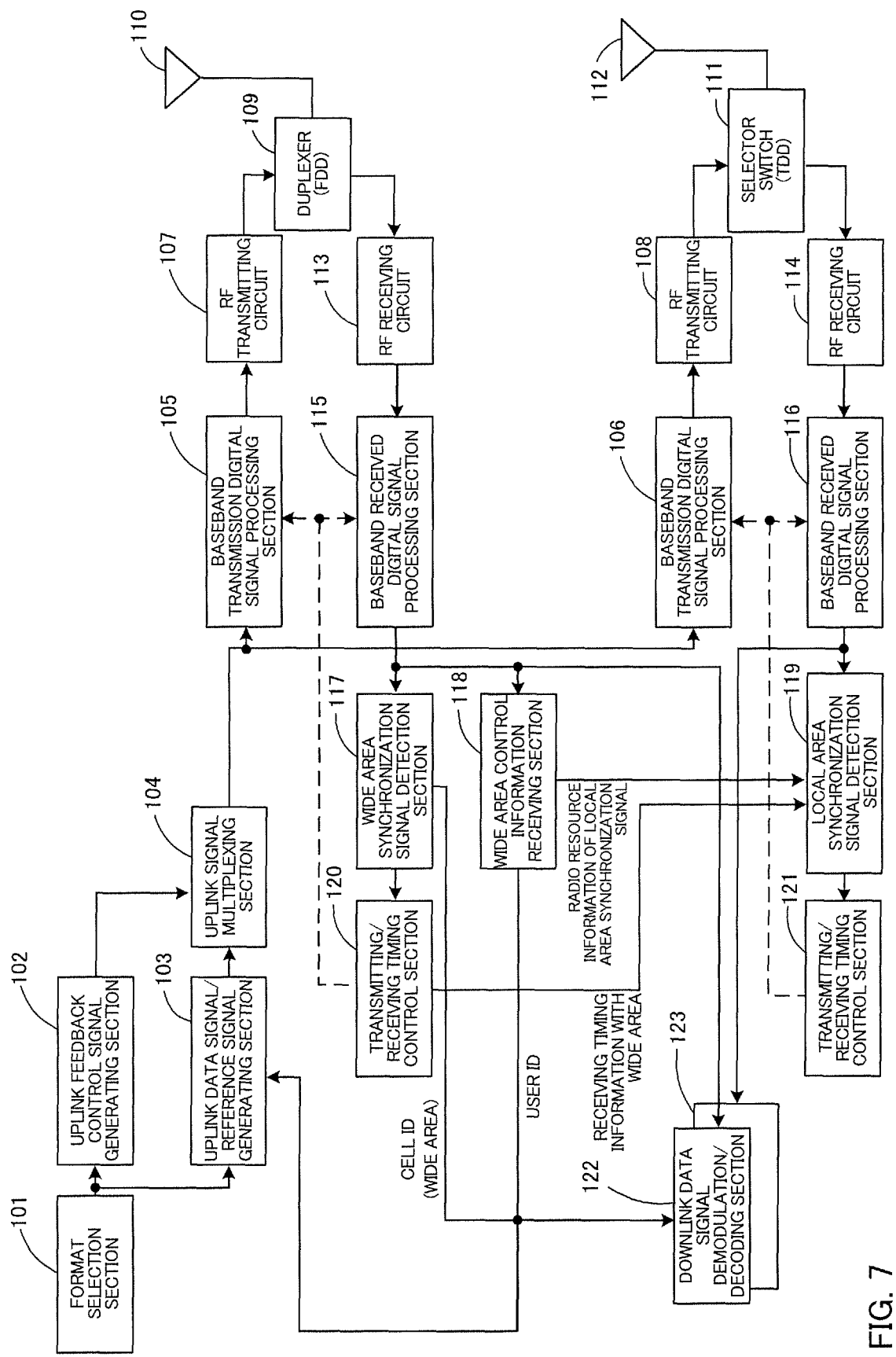
FIG. 7 is a functional block diagram of a mobile terminal apparatus.

An overall configuration of the mobile terminal apparatuses 10 will be described with reference to FIG. 7. A mobile terminal apparatus 10 has, as processing sections of the transmitting sequence, a format selection section 101, an uplink feedback control signal generating section 102, an uplink data signal/reference signal generating section 103, an uplink signal multiplexing section 104, baseband transmission digital signal processing sections 105 and 106, and RF transmitting circuits 107 and 108.

The format selection section 101 selects the transmission format for the wide area and the transmission format for the local areas. The uplink feedback control signal generating section 102 generates an uplink feedback control signal, which includes downlink radio quality, an acknowledgement signal, and so on. Note that the uplink feedback control signal may include the user IDs for the local area base station apparatuses 30A and 30B as well.

The uplink data signal/reference signal generating section 103 generates an uplink data signal and a reference signal. In the case of the transmission format for the wide area, the uplink data signal/reference signal generating section 103 generates a reference signal based on the cell ID reported from the wide area base station apparatus 20. In the case of the transmission format for the wide area, the uplink data signal/reference signal generating section 103 generates a scrambling code based on the cell ID and a user ID reported from the wide area base station apparatus 20, and scrambles the uplink data signal.

In the case of the transmission format for the local areas, the uplink data signal/reference signal generating section 103 generates a reference signal based on a user ID reported from the wide area base station apparatus 20. Also, in the case of the transmission format for the local areas, the uplink data signal/reference signal generating section 103 generates a scrambling code based on a user ID reported from the wide area base station apparatus 20, and scrambles the uplink data signal. In this way, by using user IDs from the wide area base station apparatus 20 to generate reference signals and scrambling codes, the cell IDs of the local area base station apparatuses 30 are made unnecessary.

Note that, in the case of the transmission format for the local areas, the uplink data signal/reference signal generating section 103 may generate reference signals and scrambling codes using both the cell ID of wide area C1 and user IDs.

The uplink signal multiplexing section 104 multiplexes the uplink feedback control signal, the uplink transmission data, and the reference signals. In the case of the transmission format for the wide area, the uplink feedback control signal is allocated to radio resources of a narrow band for reduced overhead. In the case of the transmission format for the local areas, the uplink feedback control signal is allocated to radio resources of a comparatively wide band or a short transmission time duration, to place significance on taking measures against interference. In this case, the uplink feedback control signal may be allocated in the allocation patterns shown in FIGS. 5B and 5C.

An uplink signal for the wide area base station apparatus 20 is input into a baseband transmission digital signal processing section 105, and subjected to digital signal processing. For example, in the case of an uplink signal of an OFDM scheme, the signal is converted from a frequency domain signal into a time sequence signal through an inverse fast Fourier transform (IFFT), and has cyclic prefixes inserted therein. Then, the uplink signal passes the RF transmitting circuit 107, and is transmitted from the wide area transmitting/receiving antenna 110 via a duplexer 109 that is provided between the transmitting sequence and the receiving sequence. In the transmitting/receiving sequence for the wide area, simultaneous transmission/reception is made possible by the duplexer 109.

An uplink signal for the local area base station apparatuses 30A and 30B is input into the baseband transmission digital signal processing section 106, and subjected to digital signal processing. For example, in the case of an uplink signal of an OFDM scheme, the signal is converted from a frequency domain signal into a time sequence signal through an inverse fast Fourier transform (IFFT), and has cyclic prefixes inserted therein. Then, the uplink signal passes the RF transmitting circuit 108, and is transmitted from the wide area transmitting/receiving antenna 112 via a selector switch 111 that is provided between the transmitting sequence and the receiving sequence. In transmitting/receiving sequence for the local areas, transmission and reception are switched with the selector switch 111.

Note that although the present embodiment is configured to provide a duplexer 109 in the wide area transmitting/ receiving sequence and provide a selector switch 111 in the local area transmitting/receiving sequence, this configuration is by no means limiting. It is equally possible to provide a selector switch III in the wide area transmitting/receiving sequence and provide a duplexer 109 in the local area transmitting/receiving sequence. Also, uplink signals for the wide area and the local areas may be transmitted simultaneously from the transmitting/receiving antennas 110 and 112, or may be transmitted separately by switching between the transmitting/receiving antennas 110 and 112.

Also, the mobile terminal apparatus 10 has, as processing sections of the receiving sequence, RF receiving circuits 113 and 114, baseband received digital signal processing sections 115 and 116, a wide area synchronization signal detection section 117, a wide area control information receiving section 118, a local area synchronization signal detection section 119, transmitting/receiving timing control sections 120 and 121, and downlink data signal demodulation/decoding sections 122 and 123.

A downlink signal from the wide area base station apparatus 20 is received at the wide area transmitting/receiving antenna 110. This downlink signal is input into the baseband received digital signal processing section 115 via the duplexer 109 and the RF receiving circuit 113, and subjected to digital signal processing. For example, in the case of a downlink signal of an OFDM scheme, the cyclic prefixes are removed, and the signal is converted from a time sequence signal into a frequency domain signal through a fast Fourier transform (FFT).

The wide area synchronization signal detection section 117 detects a wide area synchronization signal from a downlink signal for the wide area, and acquires the cell ID included in this wide area synchronization signal. The cell ID is input into the downlink data signal demodulation/decoding sections 122 and 123 and the uplink data signal/reference signal generating section 103. The transmitting/receiving timing control section 120 controls the transmitting/receiving timing of the baseband transmission digital signal processing section 105 and the baseband received digital signal processing section 115 based on the wide area synchronization signal detection result by the wide area synchronization signal detection section 117. Also, the transmitting/receiving timing control section 120 outputs the receiving timing information with the wide area base station apparatus 20 to the local area synchronization signal detection section 119.

The wide area control information receiving section 118 receives wide area control information from the downlink signal for the wide area. The wide area control information includes a user ID and radio resource information of the local area synchronization signal. The wide area control information receiving section 118 outputs the user ID to the downlink data signal demodulation/decoding sections 122 and 123 and uplink data signal/reference signal generating section 103. Also, the wide area control information receiving section 118 outputs the radio resource information of the local area synchronization signal to the local area synchronization signal detection section 119. The radio resource information of the local area synchronization signal includes, for example, the transmission interval, the frequency position and the code of the local area synchronization signal. Note that the wide area control information is received via, for example, broadcast information and RRC signaling.

The downlink data signal for the wide area is input into the downlink data signal demodulation/decoding section 122. Into the downlink data signal demodulation/decoding section 122, the cell ID of wide area C1 is input from the wide area synchronization signal detection section 117, and a user ID is input from the wide area control information receiving section 118. The downlink data signal demodulation/decoding section 122 decodes (descrambles) and demodulates the downlink data signal for the wide area based on the cell ID and the user ID.

A downlink signal from the local area base station apparatuses 30A and 30B is received at the local area transmitting/receiving antenna 112. This downlink signal is input into the baseband received digital signal processing section 116 via the selector switch III and the RF receiving circuit 114, and subjected to digital signal processing. For example, in the case of a downlink signal of an OFDM scheme, the cyclic prefixes are removed, and the signal is converted from a time sequence signal into a frequency domain signal through a fast Fourier transform (FFT).

Into the local area synchronization signal detection section 119, the radio resource information of the local area synchronization signal is input from the wide area control information receiving section 118, and receiving timing information with the wide area base station apparatus 20 is input from the transmitting/receiving timing control section 120. The local area synchronization signal detection section 119 detects the local area synchronization signal from the downlink signal for the local areas based on the radio resource information of the local area synchronization signal and the receiving timing information.

For example, into the local area synchronization signal detection section 119, the transmission interval of the local area synchronization signal is input as radio resource information of the local area synchronization signal. The transmission interval of the local area synchronization signal is set large compared to the wide area synchronization signal. By means of this configuration, the detection interval of the local area synchronization signal is set wide based on the receiving timing with the wide area base station apparatus 20 (see FIG. 3). Consequently, the number of times the mobile terminal apparatus 10 performs a cell search decreases, and therefore it becomes possible to save the power consumption of the battery. Note that the radio resource information may be, for example, the frequency position and the code of the local area synchronization signal.

When a local area synchronization signal is detected by the local area synchronization signal detection section 119, the user ID is fed back to the local area base station apparatus 30. In this case, the user ID may be fed back via the uplink feedback control signal generated in the uplink feedback control signal generating section 102. Also, when a code is included in the wide area control information, the uplink feedback control signal may be scrambled with this code.

The transmitting/receiving timing control section 121 controls the transmitting/receiving timing of the baseband transmission digital signal processing section 106 and the baseband received digital signal processing section 116 based on the local area synchronization signal detection result by the local area synchronization signal detection section 119.

A downlink data signal for the local areas is input into downlink data signal demodulation/decoding section 123. A user ID is input from the wide area control Information receiving section 118 into the downlink data signal demodulation/decoding section 123. The downlink data signal demodulation/decoding section 123 decodes (descrambles) and demodulates the downlink data signal for the local areas based on the user ID. Note that the downlink data signal demodulation/decoding section 123 may decode (descramble) and demodulate the downlink data signal based on the cell ID and the user ID. Also, downlink signals for the wide area and the local areas may be received simultaneously from the transmitting/receiving antennas 110 and 112, or may be received separately by switching between the transmitting/receiving antennas 110 and 112.

Figure 8:
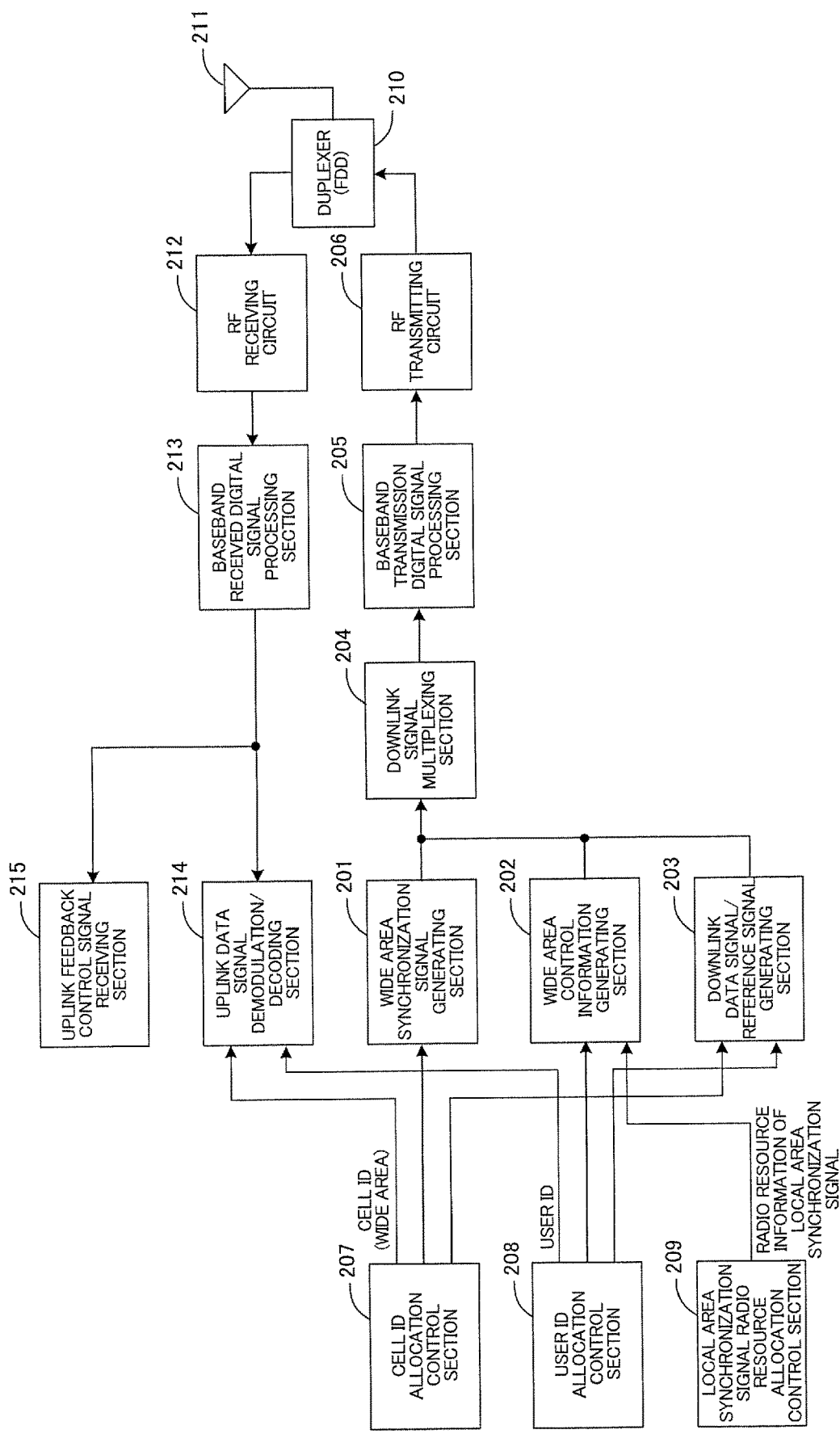
FIG. 8 is a functional block diagram of a wide area base station apparatus.

An overall configuration of the wide area base station apparatus 20 will be described with reference to FIG. 8. The wide area base station apparatus has, as processing sections of the transmitting sequence, a wide area synchronization signal generating section 201, a wide area control information generating section 202, a downlink data signal/reference signal generating section 203, a downlink signal multiplexing section 204, a baseband transmission digital signal processing section 205, and an RF transmitting circuit 206. Also, the wide area base station apparatus 20 has, as allocation control sections of control information, a cell ID allocation control section 207, a user ID allocation control section 208, and a local area synchronization signal radio resource allocation control section 209.

The wide area synchronization signal generating section 201 generates a wide area synchronization signal that includes a cell ID that is input from the cell ID allocation control section 207. The wide area control information generating section 202 generates wide area control information including a user ID that is input from the user ID allocation control section 208, and radio resource information of the local area synchronization signal that is input from the local area synchronization signal radio resource allocation control section 209. Note that the wide area control information generating section 202 may also generate wide area control information that includes the cell ID of wide area C1, a user ID, and radio resource information of the local area synchronization signal.

The downlink data signal/reference signal generating section 203 generates a reference signal based on the cell ID input from the cell ID allocation control section 207. Also, the downlink data signal/reference signal generating section 203 generates a scrambling code based on the cell ID input from the cell ID allocation control section 207 and the user ID input from the user ID allocation control section 208, and scrambles a downlink data signal. The downlink signal multiplexing section 204 multiplexes the wide area synchronization signal, the wide area control information, the downlink data signal, and the reference signal.

A downlink signal for the mobile terminal apparatus 10 is input into the baseband transmission digital signal processing section 205, and subjected to digital signal processing. For example, in the case of a downlink signal of an OFDM scheme, the signal is converted from a frequency domain signal into a time sequence signal through an inverse fast Fourier transform (IFFT), and has cyclic prefixes inserted therein. Then, the downlink signal passes the RF transmitting circuit 206, and is transmitted from the transmitting/receiving antenna 211 via a duplexer 210 provided between the transmitting sequence and the receiving sequence.

Also, the wide area base station apparatus 20 has, as processing sections of the receiving sequence, an RF receiving circuit 212, a baseband received digital signal processing section 213, an uplink data signal demodulation/decoding section 214, and an uplink feedback control signal receiving section 215.

An uplink signal from the mobile terminal apparatus 10 is received at the transmitting/receiving antenna 211, and input into the baseband received digital signal processing section 213 via the duplexer 210 and the RF receiving circuit 212. In the baseband received digital signal processing section 213, the uplink signal is subjected to digital signal processing. For example, in the case of an uplink signal of an OFDM scheme, the cyclic prefixes are removed, and the signal is converted from a time sequence signal into a frequency domain signal through a fast Fourier transform (FFT).

The uplink data signal is input into the uplink data signal demodulation/decoding section 214. Into the uplink data signal demodulation/decoding section 214, a cell ID is input from the cell ID allocation control section 207, and a user ID is input from the user ID allocation control section 208. The uplink data signal demodulation/decoding section 214 decodes (descrambles) and demodulates the uplink data signal based on the cell ID and the user ID. The uplink feedback control signal is input into the uplink feedback control signal receiving section 215. The uplink feedback control signal receiving section 215 receives, for example, as shown in FIG. 5A, the uplink feedback control signal that is allocated to radio resources of narrow bands at both ends of the system band.

Figure 9:
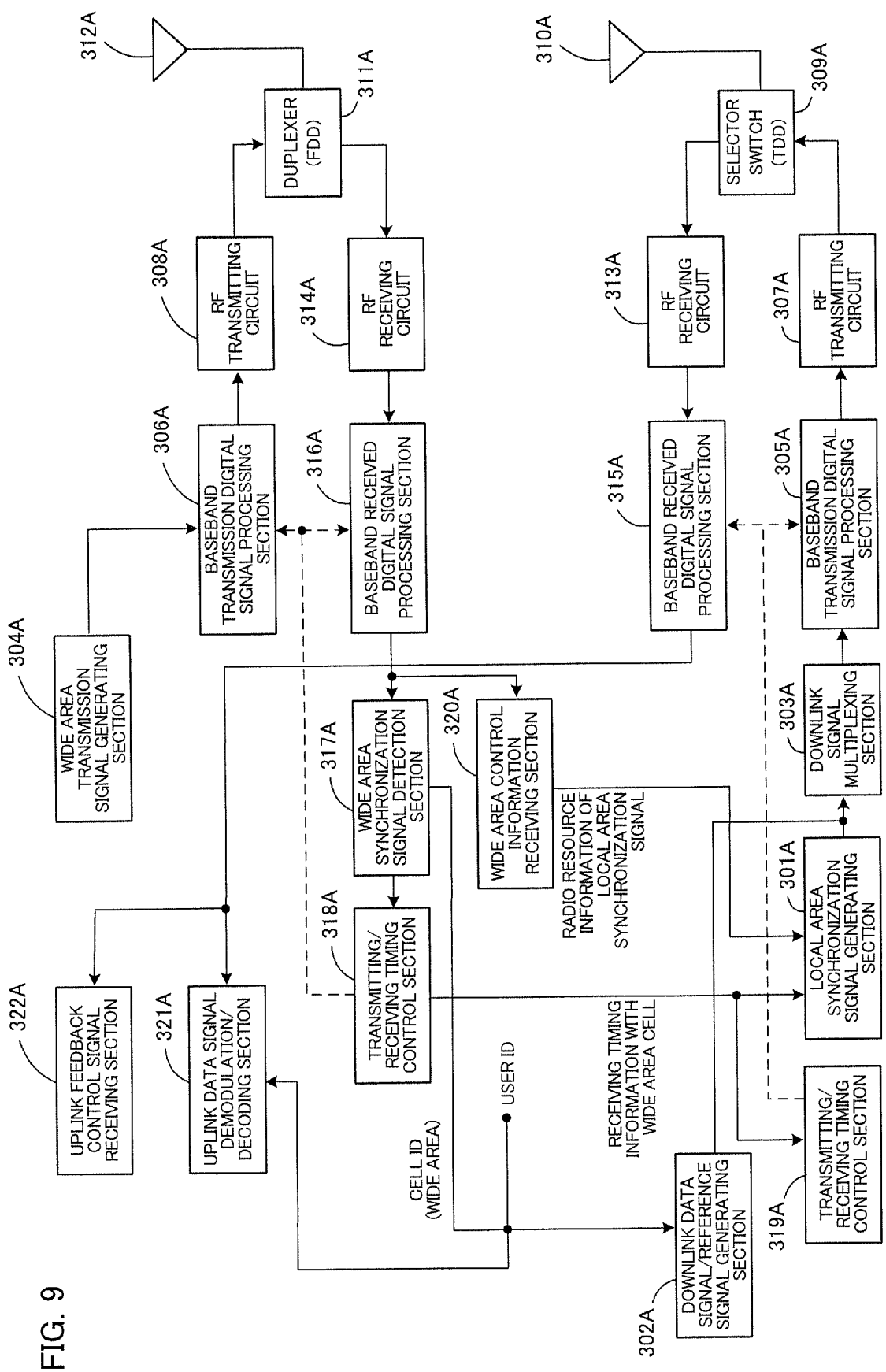
FIG. 9 is a functional block diagram of a local area base station apparatus.

Now, an overall configuration of the local area base station apparatus 30A will be described with reference to FIG. 9. Note that a user ID is reported in advance from the mobile terminal apparatus 10 to the local area base station apparatus 30A. The local area base station apparatus 30A has, as processing sections of the transmitting sequence, a local area synchronization signal generating section 301A, a downlink data signal/reference signal generating section 302A, a downlink signal multiplexing section 303A, a wide area transmission signal generating section 304A, baseband transmission digital signal processing sections 305A and 306A, and RF transmitting circuits 307A and 308A.

The local area synchronization signal generating section 301A generates a local area synchronization signal based on radio resource information of the local area synchronization signal reported from the wide area base station apparatus 20, and receiving timing information related with the wide area base station apparatus 20. For example, into the local area synchronization signal generating section 301A, the transmission interval of the local area synchronization signal is input as radio resource information of the local area synchronization signal. This transmission interval is set large compared to the wide area synchronization signal.

The local area synchronization signal generating section 301A generates the local area synchronization signal by setting a comparatively wide transmission interval, based on the receiving timing information with the wide area base station apparatus 20. This configuration makes it possible to lower the frequency of transmitting the local area synchronization signal, make the time to stop the amplifier of the network device longer, and therefore save power consumption. Note that radio resource information of the local area synchronization signal may be, for example, the frequency position and the code of the local area synchronization signal.

The downlink data signal/reference signal generating section 302A generates a reference signal based on the user ID that is reported in advance from the mobile terminal apparatus 10. Also, the downlink data signal/reference signal generating section 302A generates a scrambling code based on the user ID that is reported in advance from the mobile terminal apparatus 10, and scrambles a downlink data signal. In this way, by using a user ID to generate a reference signal and scramble the downlink data signal, the cell ID of local area C2 is made unnecessary. Note that the downlink data signal/reference signal generating section 302A may generate a reference signal and a scrambling code based on both the cell ID of wide area C1 and the user ID.

The downlink signal multiplexing section 303A multiplexes the downlink transmission data, the reference signal and the local area synchronization signal. The wide area transmission signal generating section 304A generates a transmission signal for the wide area base station apparatus 20. This wide area transmission signal includes a control signal between the local area base station apparatus 30A and the wide area base station apparatus 20.

A downlink signal for the mobile terminal apparatus 10 is input into the baseband transmission digital signal processing section 305A, and subjected to digital signal processing. For example, in the case of a downlink signal of an OFDM scheme, the signal is converted from a frequency domain signal to a time sequence signal through an inverse fast Fourier transform (IFFT), and has cyclic prefixes inserted therein. Then, the downlink signal passes the RF transmitting circuit 307A, and is transmitted from a transmitting/receiving antenna 310A via the selector switch 309A provided between the transmitting sequence and the receiving sequence.

A transmission signal for the wide area base station apparatus 20 is input into the baseband transmission digital signal processing section 306A, and subjected to digital signal processing. For example, in the case of a transmission signal of an OFDM scheme, the signal is converted from a frequency domain signal into a time sequence signal through an inverse fast Fourier transform (IFFT), and has cyclic prefixes inserted therein. Then, the transmission signal passes the RF transmitting circuit 308A, and is transmitted from the transmitting/receiving antenna 312A, via a duplexer 311A provided between the transmitting sequence and the receiving sequence.

Note that although the present embodiment is configured to provide a duplexer 311A in the transmitting/receiving sequence for the wide area and provide a selector switch 309A in the transmitting/receiving sequence for the local areas, this configuration is by no means limiting. It is equally possible to provide the selector switch 309A in the transmitting/receiving sequence for the wide area, and provide the duplexer 311A in the transmitting/receiving sequence for the local areas.

The local area base station apparatus 30A has, as processing sections of the receiving sequence, RF receiving circuits 313A and 314A, baseband received digital signal processing sections 315A and 316A, a wide area synchronization signal detection section 317A, transmitting/receiving timing control sections 318A and 319A, a wide area control information receiving section 320A, an uplink data signal demodulation/decoding section 321A, and an uplink feedback control signal receiving section 322A.

A transmission signal from the wide area base station apparatus 20 is received at the wide area transmitting/receiving antenna 312A. This transmission signal is input into the baseband received digital signal processing section 316A via the duplexer 311A and the RF receiving circuit 314A, and subjected to digital signal processing. For example, in the case of a transmission signal of an OFDM scheme, the cyclic prefixes are removed, and the signal is converted from a time sequence signal into a frequency domain signal through a fast Fourier transform (FFT).

The wide area synchronization signal detection section 317A detects the wide area synchronization signal transmitted from the wide area base station apparatus 20, and acquires the cell ID included in the wide area synchronization signal. The cell ID is input into the uplink data signal demodulation/decoding section 321A and the downlink data signal/reference signal generating section 302A. The wide area transmitting/receiving timing control section 318A controls the transmitting/receiving timing of the baseband transmission digital signal processing section 306A and the baseband received digital signal processing section 316A based on the wide area synchronization signal detection result by the wide area synchronization signal detection section 317A. Also, the wide area transmitting/receiving timing control section 318A outputs receiving timing information with the wide area base station apparatus 20 to the local area synchronization signal generating section 301A and the transmitting/receiving timing control section 319A.

The local area transmitting/receiving timing control section 319A controls the transmitting/receiving timing of the baseband transmission digital signal processing section 305A and the baseband received digital signal processing section 315A based on the receiving timing information with the wide area base station apparatus 20.

The wide area control information receiving section 320A receives wide area control information from the wide area base station apparatus 20. The wide area control information includes radio resource information of the local area synchronization signal. The wide area control information receiving section 320A outputs the radio resource information of the local area synchronization signal to the local area synchronization signal generating section 301A. The radio resource information of the local area synchronization signal includes, for example, the transmission interval, the frequency position and the code of the local area synchronization signal. Note that the wide area control information is received, for example, via broadcast information and RRC signaling.

An uplink signal from the mobile terminal apparatus 10 is received at the local area transmitting/receiving antenna 310A. This uplink signal is input into the baseband received digital signal processing section 315A via the selector switch 309A and the RF receiving circuit 313A, and subjected to digital signal processing. For example, in the case of an uplink signal of an OFDM scheme, the cyclic prefixes are removed, and the signal is converted from a time sequence signal to a frequency domain signal through a fast Fourier transform (FFT).

An uplink data signal for the local areas is input into the uplink data signal demodulation/decoding section 321A. A user ID that is reported in advance from the mobile terminal apparatus 10 is input into the uplink data signal demodulation/decoding section 321A. The uplink data signal demodulation/decoding section 321A decodes (descrambles) and demodulates the uplink data signal for the local areas based on the user ID. Note that the cell ID may be used with the user ID to demodulate/decode the uplink data signal.

An uplink feedback control signal for the local areas is input into the uplink feedback control signal receiving section 322A. The uplink feedback control signal receiving section 322A receives the uplink feedback control signal that is allocated to radio resources of a comparatively wide band or a short transmission time duration to place significance on taking measures against interference. In this case, the uplink feedback control signal may be allocated in the allocation patterns shown in FIGS. 5B and 5C.

Figure 10:
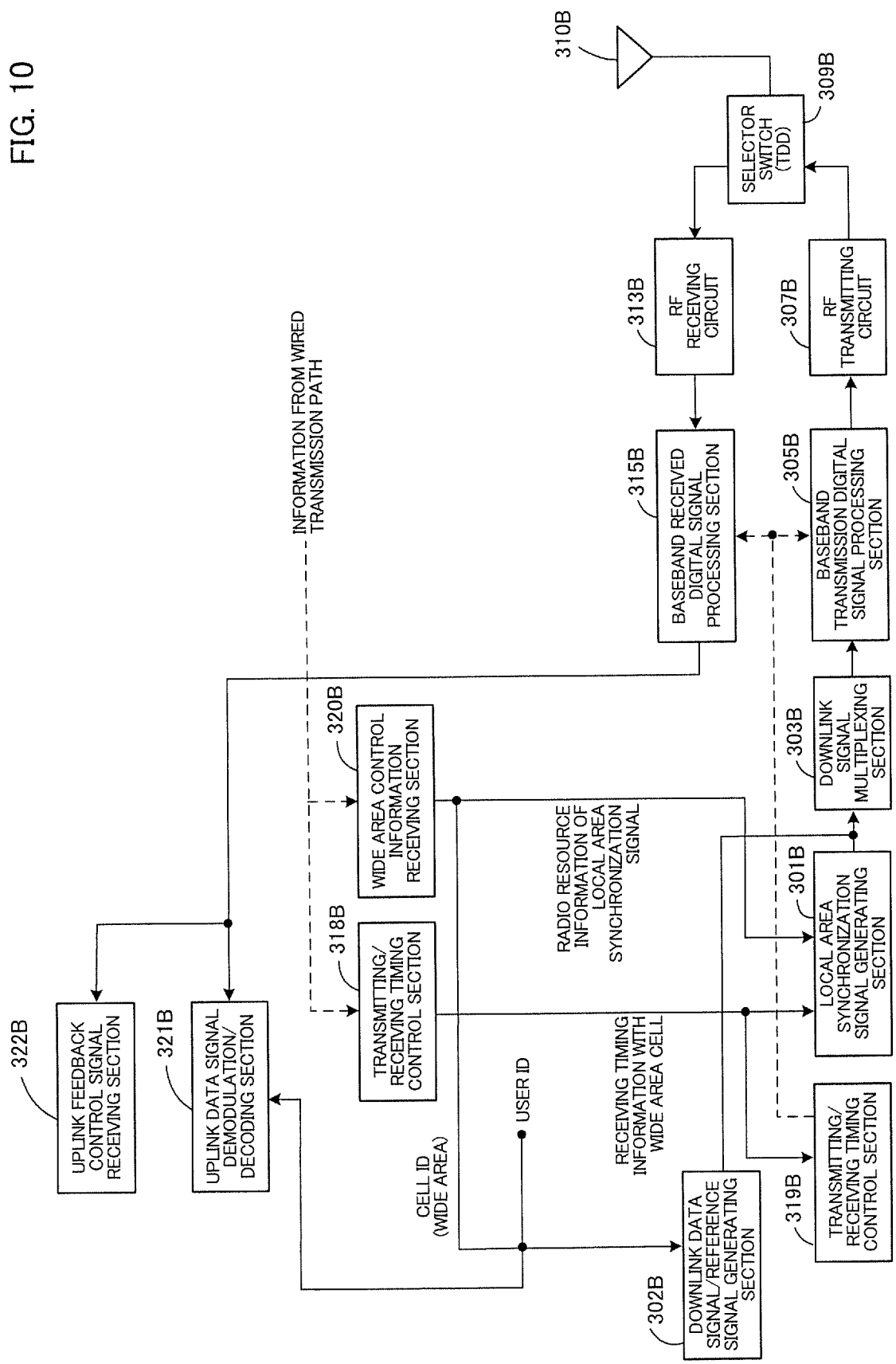
FIG. 10 is a functional block diagram of another local area base station apparatus.

An overall configuration of the local area base station apparatus 30B, which is a different type from the local area base station apparatus 30A, will be described with reference to FIG. 10. The local area base station apparatus 30B is different from the local area base station apparatus 30A in that the local area base station apparatus 30B is connected via wire with the wide area base station apparatus 20. Note that a user ID is reported in advance from the mobile terminal apparatus 10 to the local area base station apparatus 30B. The local area base station apparatus 30B has, as processing sections of the transmitting sequence, a local area synchronization signal generating section 301B, a downlink data signal/reference signal generating section 302B, a downlink signal multiplexing section 303B, a baseband transmission digital signal processing section 305B, and an RF transmitting circuit 307B.

The local area synchronization signal generating section 301B generates a local area synchronization signal based on radio resource information of the local area synchronization signal reported from the wide area base station apparatus 20, and receiving timing information with the wide area base station apparatus 20. For example, into the local area synchronization signal generating section 301B, the transmission interval of the local area synchronization signal is input as radio resource information of the local area synchronization signal. This transmission interval is set large compared to the wide area synchronization signal.

The local area synchronization signal generating section 301B generates the local area synchronization signal by setting a comparatively wide transmission interval, based on the receiving timing information with the wide area base station apparatus 20. This configuration makes it possible to lower the frequency of transmitting the local area synchronization signal, make the time to stop the amplifier of the network device longer, and therefore save power consumption. Note that radio resource information of the local area synchronization signal may be, for example, the frequency position and the code of the local area synchronization signal.

The downlink data signal/reference signal generating section 302B generates a reference signal based on the user ID that is reported in advance from the mobile terminal apparatus 10. Also, the downlink data signal/reference signal generating section 302B generates a scrambling code based on the user ID that is reported in advance from the mobile terminal apparatus 10, and scrambles a downlink data signal. In this way, by using a user ID to generate reference signals and scramble the downlink data signal, the cell ID of local area C2 is made unnecessary. Note that the downlink data signal/reference signal generating section 302B may generate a reference signal and a scrambling code based on both the cell ID of wide area C1 and the user ID. The downlink signal multiplexing section 303B multiplexes the downlink transmission data, the reference signal and the local area synchronization signal.

A downlink signal for the mobile terminal apparatus 10 is input into the baseband transmission digital signal processing section 305B, and subjected to digital signal processing. For example, in the case of a downlink signal of an OFDM scheme, the signal is converted from a frequency domain signal to a time sequence signal through an inverse fast Fourier transform (IFFT), and has cyclic prefixes inserted therein. Then, the downlink signal passes the RF transmitting circuit 307B, and is transmitted from a transmitting/receiving antenna 310B via the selector switch 309B provided between the transmitting sequence and the receiving sequence.

Note that a duplexer may be provided instead of the selector switch 309B.

The local area base station apparatus 30B has, as processing sections of the receiving sequence, an RF receiving circuit 313B, a baseband received digital signal processing section 315B, transmitting/receiving timing control sections 318B and 319B, a wide area control information receiving section 320B, an uplink data signal demodulation/decoding section 321B, and an uplink feedback control signal receiving section 322B.

The wide area transmitting/receiving timing control section 318B receives receiving timing information with the wide area base station apparatus 20 from the wide area base station apparatus 20 via a wire transmission path. Also, the wide area transmitting/receiving timing control section 318B outputs the receiving timing information with the wide area base station apparatus 20 to the local area synchronization signal generating section 301B and the transmitting/receiving timing control section 319B.

The local area transmitting/receiving timing control section 319B controls the transmitting/receiving timing of the baseband transmission digital signal processing section 305B and baseband received digital signal processing section 315B based on the receiving timing information with the wide area base station apparatus 20.

The wide area control information receiving section 320B receives the wide area control information from the wide area base station apparatus 20 via the wire transmission path. The wide area control information includes radio resource information of the local area synchronization signal and the cell ID of wide area C1. The wide area control information receiving section 320B outputs the radio resource information of the local area synchronization signal to the local area synchronization signal generating section 3018B. The radio resource information of the local area synchronization signal includes, for example, the transmission interval, the frequency position, and the code of the local area synchronization signal. Note that the wide area control information is received via, for example, broadcast information and RRC signaling.

An uplink signal from the mobile terminal apparatus 10 is received at the local area transmitting/receiving antenna 310B, and input into the baseband received digital signal processing section 315B via the selector switch 309B and the RF receiving circuit 313B. In the baseband received digital signal processing section 315B, the uplink signal is subjected to digital signal processing. For example, in the case of an uplink signal of an OFDM scheme, the cyclic prefixes are removed, and the signal is converted from a time sequence signal to a frequency domain signal through a fast Fourier transform (FFT).

An uplink data signal for the local areas is input into the uplink data signal demodulation/decoding section 321B. Into the uplink data signal demodulation/decoding section 321B, a user ID that is reported in advance from the mobile terminal apparatus 10 is input. The uplink data signal demodulation/decoding section 321B decodes (descrambles) and demodulates the uplink data signal for the local areas based on the user ID. Note that the cell ID may be used with the user ID to demodulate/decode the uplink data signal.

An uplink feedback control signal for the local areas is input into the uplink feedback control signal receiving section 322B. The uplink feedback control signal receiving section 322B receives the uplink feedback control signal that is allocated to radio resources of a comparatively wide band or a short transmission time duration to place significance on taking measures against interference. In this case, the uplink feedback control signal may be allocated in the allocation patterns shown in FIGS. 5B and 5C.

Figure 11:
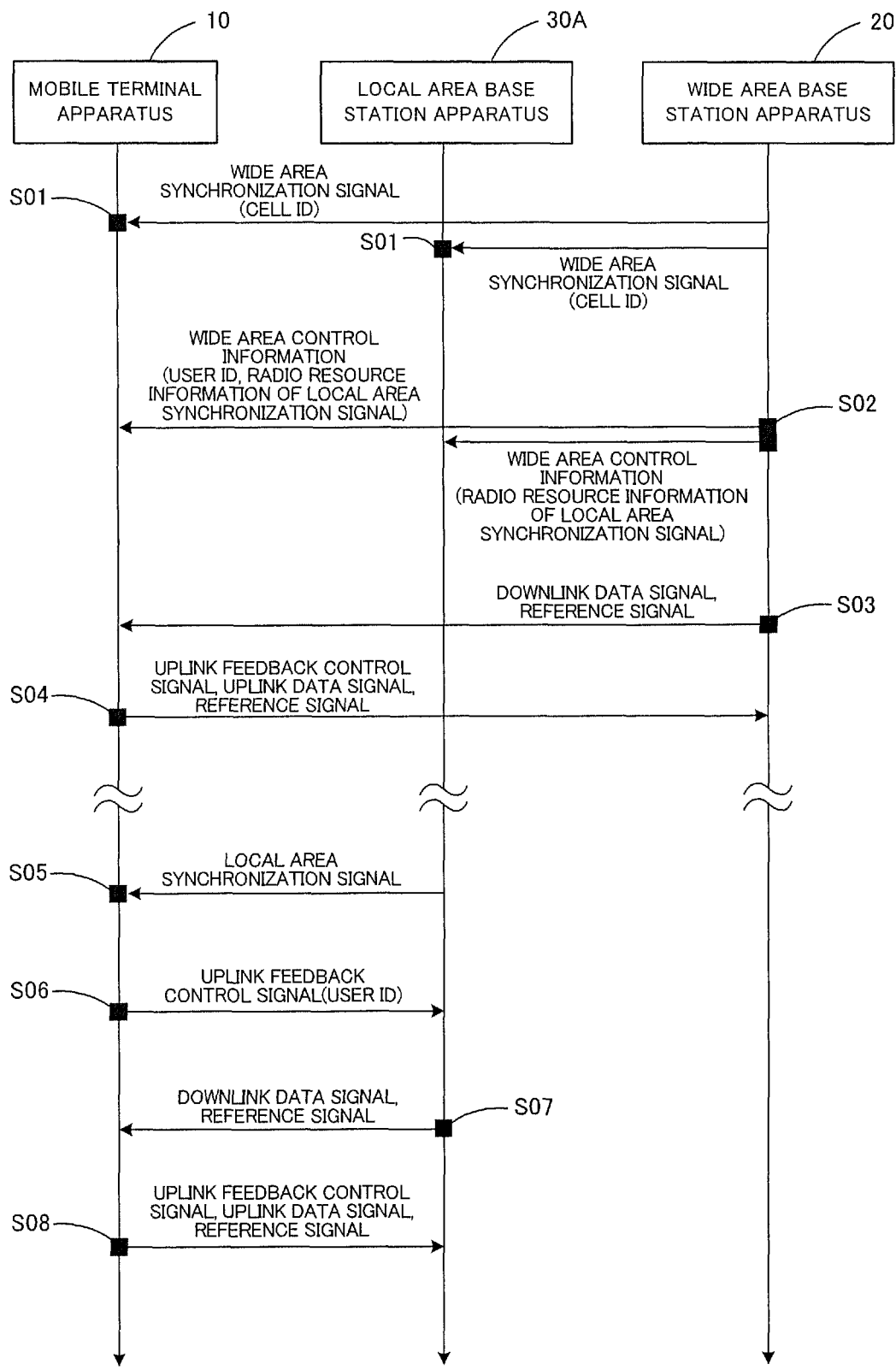
FIG. 11 is a sequence diagram to show an example of a communication process in a radio communication system.

An example of the processing sequence of the radio communication system according to the present embodiment will be described with reference to FIG. 11. Here, for ease of explanation, the description of the local area base station apparatus 30B will be omitted.

First, the mobile terminal apparatus 10 and the local area base station apparatus 30A perform a cell search, and the wide area synchronization signal from the wide area base station apparatus 20 is detected (step S01). By this means, synchronization is established between the wide area base station apparatus 20 and the mobile terminal apparatus 10, and between the wide area base station apparatus 20 and the local area base station apparatus 30A. The wide area synchronization signal includes the cell ID of wide area C1.

Next, wide area control information is transmitted from the wide area base station apparatus 20 to the mobile terminal apparatus 10 and the local area base station apparatus 30A via broadcast information and RRC signaling (step S02). A user ID and radio resource information of the local area synchronization signal are transmitted to the mobile terminal apparatus 10 as wide area control information. Also, radio resource information of the local area synchronization signal is transmitted to the local area base station apparatus 30A as wide area control information. Also, the radio resource information of the local area synchronization signal includes, for example, the transmission interval, the frequency position and the code of the local area synchronization signal.

Then, a downlink data signal and a reference signal are transmitted from the wide area base station apparatus 20 to the mobile terminal apparatus 10 (step S03). The downlink data signal is randomized based on the cell ID of wide area C1 and a user ID, and the reference signal is randomized by the cell ID of wide area C1. The downlink data signal and the reference signal received in the mobile terminal apparatus 10 are demodulated/decoded based on the cell ID, the user ID and so on, reported from the wide area base station apparatus 20.

Meanwhile, an uplink feedback control signal, an uplink data signal and a reference signal are transmitted from the mobile terminal apparatus 10 to the wide area base station apparatus 20 (step S04). The uplink data signal is randomized by the cell ID of wide area C1 and the user ID reported from the wide area base station apparatus 20, and the reference signal is randomized by the cell ID of wide area C1. The uplink data signal and reference signal received in the wide area base station apparatus 20 are demodulated/decoded based on the cell ID and the user ID.

Next, when the mobile terminal apparatus 10 moves into local area C2, the mobile terminal apparatus 10 performs a cell search, and the local area synchronization signal from the local area base station apparatus 30A is detected (step S0S). In this case, the local area synchronization signal is detected based on radio resource information of the local area synchronization signal included in wide area control information. By this means, synchronization is established between the local area base station apparatus 30A and the mobile terminal apparatus 10. To this radio resource information of the local area synchronization signal, parameters that reduce the power consumption required for a cell search are set.

Next, the user ID is fed back from the mobile terminal apparatus 10 to the local area base station apparatus 30A (step S06). The user ID may be transmitted from the mobile terminal apparatus 10 to the local area base station apparatus 30A in an uplink feedback control signal. In this way, the local area base station apparatus 30A acquires the user ID from the mobile terminal apparatus 10 right after the detection of the local area synchronization signal by the mobile terminal apparatus 10.

Then, a downlink data signal and a reference signal are transmitted from the local area base station apparatus 30A to the mobile terminal apparatus (step S07). The downlink data signal and the reference signal are randomized by the user ID fed back from the mobile terminal apparatus 10. The downlink data signal and the reference signal received in the mobile terminal apparatus 10 are demodulated/decoded based on the user ID reported from the wide area base station apparatus 20. Note that the cell ID may be used with the user ID to randomize and demodulate/decode the downlink data signal and the reference signal.

Meanwhile, an uplink feedback control signal, an uplink data signal, and a reference signal are transmitted from the mobile terminal apparatus 10 to the local area base station apparatus 30A (step S08). The uplink data signal and the reference signal are randomized based on the user ID reported from the wide area base station apparatus 20. The uplink data signal and the reference signal received in the local area base station apparatus 30A are demodulated/decoded based on the user ID fed back from the mobile terminal apparatus 10. Note that the cell ID may be used with the user ID to randomize and demodulate/decode the uplink data signal and the reference signal.

As described above, with the radio communication system 1 according to the present embodiment, it is possible to easily assimilate local area C2 into wide area C1 having different requirements, by utilizing wide area control information that is used in the radio communication scheme for the wide area, in the radio communication scheme for the local area. Consequently, it becomes possible to provide highly efficient local area radio access specialized for local area C2, in local area C2 arranged in wide area C1.

The present invention is by no means limited to the above embodiment and can be implemented in various modifications. For example, without departing from the scope of the present invention, it is possible to adequately change the wide area control information, the resources allocated for the uplink feedback control signal, the number of processing sections, and the order of processing steps in the above description, and implement the present invention. Besides, the present invention can be implemented with various changes, without departing from the scope of the present invention.

The disclosure of Japanese Patent Application No. 2011-247804, filed on Nov. 11, 2011, including the specification, drawings and abstract, is incorporated herein by reference in its entirety.

The invention claimed is:

1. A user equipment comprising:
   a first receiver that receives control information in a first cell, the control information including a transmission interval of a detection signal; and
   a second receiver that receives the detection signal in a second cell based on the control information,
   wherein:
   in the second cell, the control information is used to specify a radio resource to which the detection signal is allocated and
   in the second cell, the transmission interval of the detection signal is set wider than a transmission interval of a synchronization signal used in the first cell and is set to be variable.

2. The user equipment according to claim 1, wherein in the second cell, the detection signal is allocated to the radio resource of a wider time and/or frequency range than the synchronization signal used in the first cell.

3. A base station apparatus that communicates in a second cell with a user equipment configured to communicate in a first cell and the second cell, the base station apparatus comprising:
- a receiver that receives control information from a base station apparatus that forms the first cell, the control information including a transmission interval of a detection signal;
- a processor that generates a detection signal based on the control information; and
- a transmitter that transmits the detection signal to the user equipment, wherein:
- in the second cell, the control information is used to specify a radio resource to which the detection signal is allocated and
- in the second cell, the transmission interval of the detection signal is set wider than a transmission interval of a synchronization signal used in the first cell and is set to be variable.

4. A radio communication method comprising the steps of:
- receiving control information in a first cell, the control information including a transmission interval of a detection signal; and
- receiving the detection signal in a second cell based on the control information, wherein:
- in the second cell, the control information is used to specify a radio resource to which the detection signal is allocated and
- in the second cell, the transmission interval of the detection signal is set wider than a transmission interval of a synchronization signal used in the first cell and is set to be variable.

* * * * *